P. KENNEDY.
GENERATOR SUSPENSION FOR TRAIN LIGHTING SYSTEMS.
APPLICATION FILED SEPT. 29, 1909.
949,934.
Patented Feb. 22, 1910.
2 SHEETS—SHEET 1.
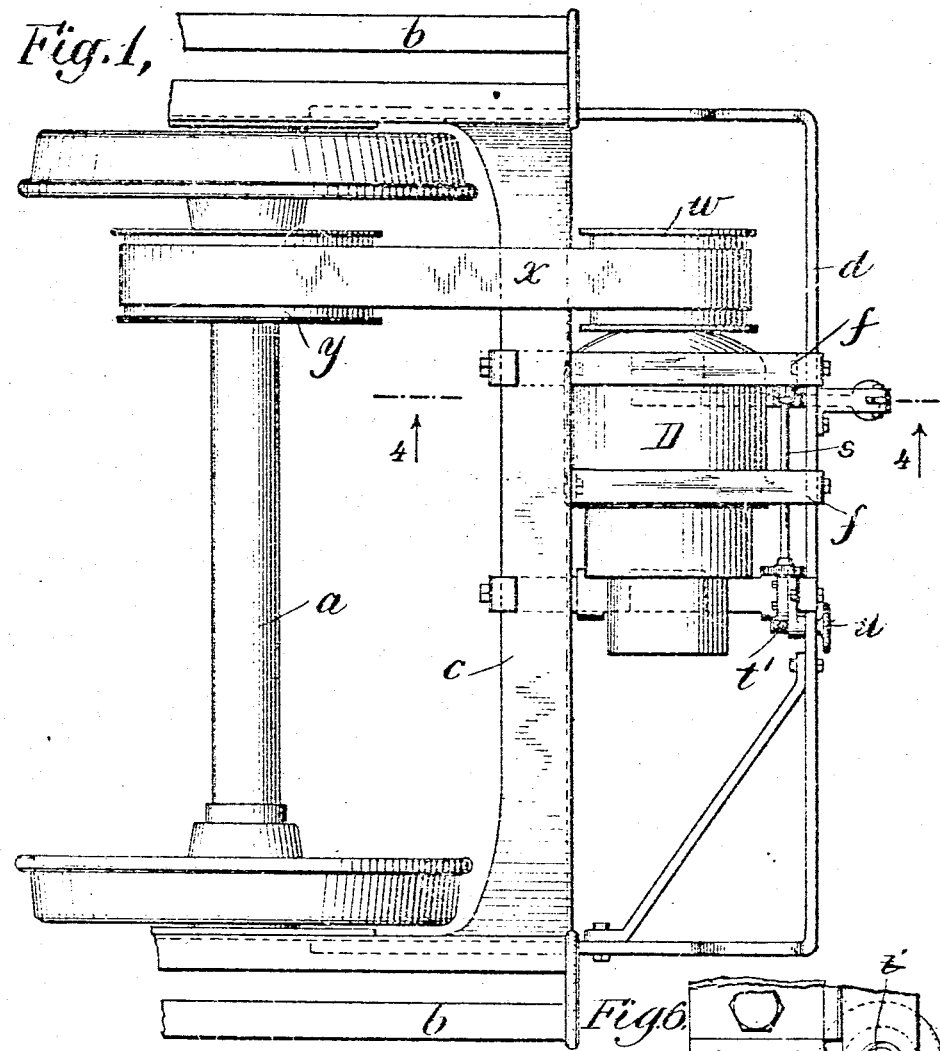

P. KENNEDY.
GENERATOR SUSPENSION FOR TRAIN LIGHTING SYSTEMS.
APPLICATION FILED SEPT. 29, 1909.
949,934. Patented Feb. 22, 1910.
2 SHEETS—SHEET 2.
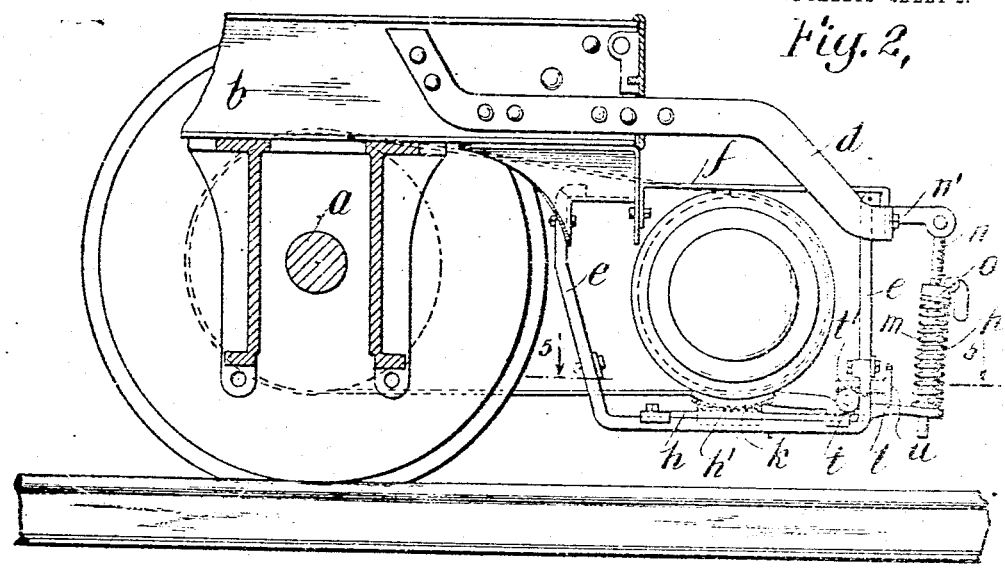
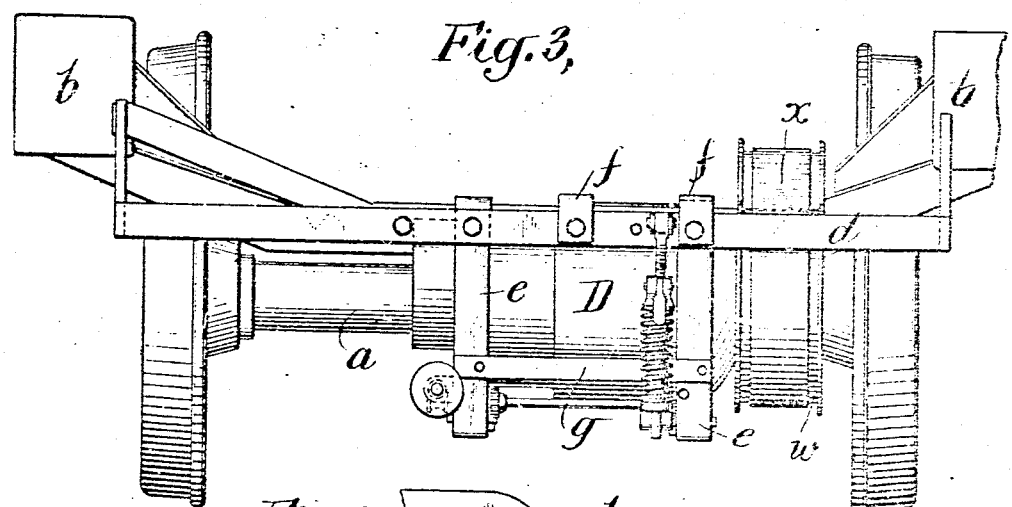
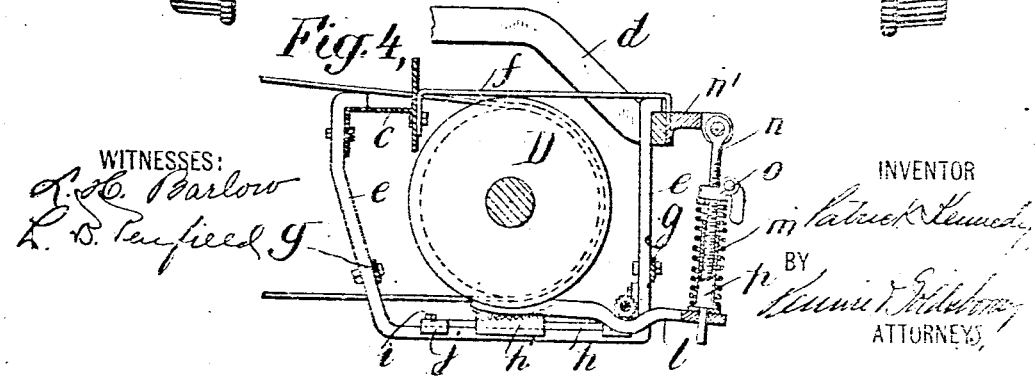

UNITED STATES PATENT OFFICE.

PATRICK KENNEDY, OF NEW YORK, N. Y.

GENERATOR SUSPENSION FOR TRAIN-LIGHTING SYSTEMS.

949,934.      Specification of Letters Patent.      Patented Feb. 22, 1910.

Application filed September 29, 1909. Serial No. 520,155.

*To all whom it may concern:*

Be it known that I, PATRICK KENNEDY, a citizen of the United States, residing in the city, county, and State of New York, have invented certain new and useful Improvements in Generator Suspension for Train-Lighting Systems; and I do hereby declare the following to be a full, clear, and exact description of the invention, such as will enable others skilled in the art to which it appertains to make and use the same.

The invention relates to the suspension of dynamos for car lighting systems, beneath the body of the car and outside of the truck frame, and it constitutes an improvement upon that well known mode of suspension in which the dynamo is pivoted in a cradle and is provided with a rod actuated by a yielding spring for the purpose of holding the driving belt or chain taut.

In accordance with the invention, instead of fastening the dynamo in the cradle by a pivot, they are united by an intermeshing rack and pinion, so that the effect of the spring is to roll the dynamo away from the driving axle, to tighten the belt.

The invention furthermore provides a convenient mechanism for making a permanent adjustment of the position of the dynamo, as distinguished from the temporary and yielding adjustment made from instant to instant by the spring.

The particular nature of the improvement will be more completely understood from the following description and the accompanying drawings, in which—

Figure 1 is a plan view of the end of a truck with the dynamo and its supporting cradle. Fig. 2 is a side elevation of the dynamo and cradle, the rear portion of the truck being shown in section. Fig. 3 is an end elevation of the same parts. Fig. 4 is a section on the line 4—4 of Fig. 1, Fig. 5 is a plan on the line 5—5 of Fig. 2, and Fig 6 is a detail elevation on a larger scale of the mechanism for adjusting the position of the dynamo by hand.

The invention is shown as applied to a steel truck of a standard construction, of which there is illustrated the axle $a$ and its wheels, the end portion of the side sills $b$, and the end sill $c$. The cradle for the dynamo is supported from the end sill $c$ and a rearwardly extending bracket device $d$, the cradle being made up of two substantially U-shaped frame members $e$ braced by cross-pieces $g$, and having retaining straps $f$ across the top to hold the dynamo to its seat and the rack and pinion in engagement.

The intermeshing rack and pinion mechanism which is characteristic of the invention, is conveniently formed, in the particular embodiment illustrated herein, of two sliding rack plates $h$ on the horizontal portions of the frame members $e$ and slotted to receive the bolts $i$, which with the turned down flanges $j$ serve to guide the rack plates on the horizontal members of the frame pieces and to hold them thereto; and a pair of arc-shaped pinion or gear sections $k$, attached to the casing of dynamo D and meshing with the rack sections $h'$ on the rack plates $h$.

Extending from the lower portion of the casing of the dynamo is an arm $l$ upon the end of which rests the lower end of the adjusting spring $m$, surrounding the guide rod $n$ pivoted in the bracket $n'$ extending from the yoke $d$ as shown. It will be observed that with this arrangement the tension of the belt $x$ extending between pulley $w$ on the dynamo shaft and driving pulley $y$ on axle $a$ is in such a direction as to roll the dynamo along the racks $h'$ to the left in Fig. 2, and this tendency is yieldingly opposed by the belt-tightening spring $m$, which tends to roll the dynamo in the opposite direction, thereby maintaining a tight transmission belt.

The tension on the spring $m$ is controlled by means of the traveling compression nut $o$ on the screw-threaded guide rod $n$, but I have found that in practice there is danger that too great tension will be put on the driving belt by unskilled or careless operators, and to prevent this I provide a stop for the compression nut, which may, for example, take the form of a limiting sleeve $p$ between the end of arm $l$ and the nut $o$ so that the spring $m$ cannot be compressed into a space less than the length of the sleeve $p$.

The above described structure provides for the yielding adjustment of the belt from instant to instant, but it is desirable in practice that there should be means for permanently adjusting the distance of the dynamo from the driving axle within quite wide limits, and it is for this purpose that the rack plates $h$ are arranged to slide on the frame members $e$. In order that this adjustment may be effected in a definite and convenient manner, I provide mechanism for sliding the rack plates $h$ along the members e. On the face of each of the sliding rack plates h, at the end thereof, and, in the embodiment illustrated, on the inner side so as to clear the vertical portions of members e, are rack sections q engaged by pinions r on a shaft s journaled in the frame pieces e as shown, and capable of being rotated by a worm gearing comprising a worm wheel t and worm t', the worm being on a shaft carrying a hand wheel u on the outside of the cradle and in a convenient position to be turned to slide the rack plates h and thereby adjust the position of the dynamo with respect to the driving axle.

Having thus described my invention, what I claim is:

1. A car-truck having a bracket device extending outside of an end sill thereof, in combination with a cradle between said bracket and the end sill, a dynamo within the cradle, an intermeshing rack and pinion engagement between the dynamo and cradle, a pulley on the shaft of the dynamo, a driving pulley on the axle of the truck, a driving-belt extending between said pulleys, and means for elastically drawing the dynamo away from the truck axle to maintain the tension of the belt; substantially as described.

2. A car-truck having a bracket device extending outside of an end sill thereof, in combination with a cradle between said bracket and the end sill, a dynamo within the cradle, an intermeshing rack and pinion engagement between the dynamo and cradle, a pulley on the shaft of the dynamo, a driving pulley on the axle of the truck, a driving-belt extending between said pulleys, means for elastically drawing the dynamo away from the truck axle to maintain the tension of the belt, and mechanism for giving a permanent adjustment to the position of the dynamo, comprising gearing connected to the rack and pinion mechanism to effect relative movement thereof and an actuating handle for the gearing extending outside of the cradle; substantially as described.

3. A car-truck having a bracket device extending outside of an end sill thereof, in combination with a dynamo movably supported between the bracket and end sill, a pulley on the shaft of the dynamo, a driving pulley on the axle of the truck, a driving belt extending between said pulleys, a compressed belt-tightening spring for drawing the dynamo away from the axle of the truck, a guide rod for the spring, a compression nut on the rod and a stop for the compression nut to limit the compression of the spring; substantially as described.

4. A car truck having a bracket device extending outside of an end sill thereof, a cradle between said bracket and the end sill, a dynamo within the cradle, a pulley on the shaft of the dynamo, a driving pulley on the axle of the truck, and a driving belt extending between said pulleys, in combination with a rack slidably supported in the cradle and an intermeshing pinion section secured to the dynamo casing, gearing for sliding the rack, an actuating handle for said gearing extending outside of the cradle, and a spring connected to the dynamo to draw it away from the truck axle; substantially as described.

5. A car truck having a bracket device extending outside of an end sill thereof, a cradle between said bracket and the end sill, a dynamo within the cradle, a pulley on the shaft of the dynamo, a driving pulley on the axle of the truck, and a driving belt extending between said pulleys, in combination with a rack slidably supported in the cradle, an intermeshing pinion section secured to the dynamo casing, a lever arm l extending from the lower portion of the dynamo casing, a guide rod n hung from the bracket and extending through the end of the lever arm, a spring surrounding said guide rod, a compression nut o for compressing said spring, and a stop for the compression nut to limit the compression of the spring; substantially as described.

6. A car truck having a bracket device extending outside of the end sill thereof, a cradle between the bracket and the end sill, a dynamo within the cradle, a pulley on the shaft of the dynamo, a driving pulley on the axle of the truck, and a driving belt extending between said pulleys, in combination with a pair of rack sections slidably supported on the cradle and intermeshing pinion sections secured to the dynamo casing, a lever arm extending from the lower portion of the dynamo casing, and a compression spring acting on the free end of said lever to roll the dynamo away from the axle of the truck; substantially as described.

7. A car-truck having a bracket-device extending outside of an end sill thereof, in combination with a cradle between said bracket and the end sill, a dynamo within the cradle, an intermeshing rack and pinion engagement between the dynamo and cradle, a pulley on the shaft of the dynamo, a driving pulley on the axle of the truck, a driving belt extending between said pulleys, means for elastically drawing the dynamo away from the truck axle to maintain the tension of the belt, and retaining straps across the top of the cradle to hold the rack and pinion in engagement; substantially as described.

In testimony whereof I affix my signature in presence of two witnesses.

PATRICK KENNEDY.

Witnesses:
 Aug. Treadwell, Jr.,
 Walter E. Green.